(12) United States Patent
Kubota et al.

(10) Patent No.: US 11,892,062 B2
(45) Date of Patent: Feb. 6, 2024

(54) PRELOAD DETECTABLE SCREW DEVICE

(71) Applicant: THK CO., LTD., Tokyo (JP)

(72) Inventors: Yuji Kubota, Tokyo (JP); Hirofumi Suzuki, Tokyo (JP); Takamitsu Tomiyama, Tokyo (JP); Yuta Tsujisawa, Tokyo (JP)

(73) Assignee: THK CO., LTD., Tokyo (JP)

( * ) Notice: Subject to any disclaimer, the term of this patent is extended or adjusted under 35 U.S.C. 154(b) by 203 days.

(21) Appl. No.: 17/428,731

(22) PCT Filed: Jan. 20, 2020

(86) PCT No.: PCT/JP2020/001652
§ 371 (c)(1),
(2) Date: Aug. 5, 2021

(87) PCT Pub. No.: WO2020/162145
PCT Pub. Date: Aug. 13, 2020

(65) Prior Publication Data
US 2022/0128136 A1    Apr. 28, 2022

(30) Foreign Application Priority Data
Feb. 6, 2019  (JP) ................. 2019-019349

(51) Int. Cl.
*F16H 25/22* (2006.01)
*F16H 57/01* (2012.01)

(52) U.S. Cl.
CPC ......... *F16H 25/2204* (2013.01); *F16H 57/01* (2013.01); *F16H 2057/012* (2013.01)

(58) Field of Classification Search
CPC . F16H 25/2204; F16H 57/01; F16H 2057/012
See application file for complete search history.

(56) References Cited

U.S. PATENT DOCUMENTS 5,644,951 A    7/1997  Hatamura
9,464,703 B2 * 10/2016  Jeng .................... F16H 25/2204
(Continued)

FOREIGN PATENT DOCUMENTS

| JP | H05-141498 | 6/1993 |
| JP | 2007-333195 | 12/2007 |

(Continued)

OTHER PUBLICATIONS

International Search Report for PCT/JP2020/001652 dated Feb. 10, 2020, 5 pages.
(Continued)

*Primary Examiner* — Jake Cook
(74) *Attorney, Agent, or Firm* — NIXON & VANDERHYE (57) ABSTRACT

A screw device is provided which applies preload with a single nut and can easily detect preload. The screw device of includes: a screw shaft having an outer helical groove; a nut fitted on the screw shaft, the nut having an inner helical groove, and a return path to which a passage formed between the outer groove and the inner groove is connected; a plurality of rolling elements placed between the passage and the return path; and a strain sensor attached to an outer surface of the nut. At least one hole is provided between an attachment surface, to which the strain sensor is attached, of the nut and/or a vicinity thereof and an inner surface of the nut.

12 Claims, 12 Drawing Sheets

(56) References Cited

U.S. PATENT DOCUMENTS

| | | | |
|---|---|---|---|
| 2004/0093970 A1* | 5/2004 | Iida | F16C 29/063 |
| | | | 74/89.33 |
| 2005/0087031 A1* | 4/2005 | Ohkubo | F16H 25/2223 |
| | | | 74/424.82 |
| 2017/0167584 A1* | 6/2017 | Kuo | F16H 25/2209 |
| 2019/0204064 A1* | 7/2019 | Chen | G01B 21/22 |
| 2019/0353230 A1* | 11/2019 | Kajihara | F16H 25/2204 |

FOREIGN PATENT DOCUMENTS

| | | |
|---|---|---|
| JP | 2016-223493 | 12/2016 |
| JP | 2017-150502 | 8/2017 |

OTHER PUBLICATIONS

Written Opinion of the ISA for PCT/JP2020/001652 dated Feb. 10, 2020, 3 pages.

\* cited by examiner

PRELOAD DETECTABLE SCREW DEVICE

CROSS-REFERENCE TO RELATED APPLICATIONS

This application is the U.S. national phase of International Application No. PCT/JP2020/001652 filed Jan. 20, 2020 which designated the U.S. and claims priority to Japanese Application No. 2019-019349 filed Feb. 6, 2019, the entire contents of each of which are hereby incorporated by reference.

TECHNICAL FIELD

The present invention relates to a preload detectable screw device.

BACKGROUND ART

A screw device includes a screw shaft, a nut, and a plurality of rolling elements disposed between the screw shaft and the nut. When the screw shaft is rotated by, for example, a motor, the nut is caused to perform linear motion. The screw device is used as a machine element that converts motion between rotary and linear motion, and has the feature of being capable of reducing frictional resistance since the rolling elements perform rolling motion while the screw shaft is rotated.

Preload is applied to the screw device to increase the stiffness of the screw device and positioning accuracy. Double nut preloading, offset preloading, and oversized ball preloading are known as preloading methods for the screw device. In double nut preloading, two nuts are used and a spacer is placed between the two nuts to eliminate the axial clearance of each nut created between the screw shaft, the nut, and the balls. Offset preloading is a method where preload is applied with a single nut. A part of an inner helical groove of the nut is offset relative to another part of the inner groove in the axial direction of the nut to eliminate the axial clearance. Oversized ball preloading is a method where preload is applied with a single nut. Rolling elements that are larger than a passage between the inner helical groove of the nut and an outer helical groove of the screw shaft are inserted to eliminate the axial clearance.

If the screw device is used for a long period of time, the rolling elements, the screw shaft, and the nut are worn. If they are worn, the preload of the screw device decreases to reduce the stiffness of the screw device and positioning accuracy. Patent Literature 1 discloses a ball screw of the double nut preloading method where a strain sensor as a spacer is disposed between two nuts for the purpose of detecting preload. The strain sensor detects an axial force acting on opposing surfaces of the two nuts. Accordingly, a reduction in preload due to changes over time can be monitored.

CITATION LIST

Patent Literature

Patent Literature 1: JP 2016-223493 A

SUMMARY OF INVENTION

Technical Problem

A screw device that applies preload with a single nut has a problem that it is more difficult to detect preload than a screw device that applies preload with double nuts. This is because the amount of strain on an outer surface of the nut resulting from a preload is small even if a strain sensor is attached to the outer surface of the nut.

Hence, an object of the present invention is to provide a screw device that applies preload with a single nut and can easily detect preload.

Solution to Problem

In order to solve the above problem, one aspect of the present invention is a preload detectable screw device including: a screw shaft having an outer helical groove; a nut fitted on the screw shaft, the nut having an inner helical groove, and a return path to which a passage formed between the outer groove and the inner groove is connected; a plurality of rolling elements placed in the passage and the return path; and a strain sensor attached to an outer surface of the nut, in which at least one hole is provided between an attachment surface, to which the strain sensor is attached, of the nut and/or a vicinity thereof and an inner surface of the nut.

Advantageous Effects of Invention

According to the one aspect of the present invention, the at least one hole is provided between the attachment surface, to which the strain sensor is attached, of the nut and/or the vicinity thereof and the inner surface of the nut. Accordingly, the outer surface of the nut becomes resistant to the propagation of the preload in a portion where the at least one hole is provided. A stress concentration occurs at the boundary between a portion that deforms and a portion that resists deformation on the outer surface of the nut. The amount of strain is increased. Accordingly, it facilitates the strain sensor detecting preload.

DESCRIPTION OF EMBODIMENTS

Embodiments of a preload detectable screw device (hereinafter, simply referred to as the screw device) of the present invention are described in detail below with reference to the accompanying drawings. However, the screw device of the present invention can be embodied in various modes, and is not limited to the embodiments described in the description. The embodiments are provided with the intention of allowing those skilled in the art to fully understand the scope of the invention by fully disclosing the description.

First Embodiment

Figure 1:
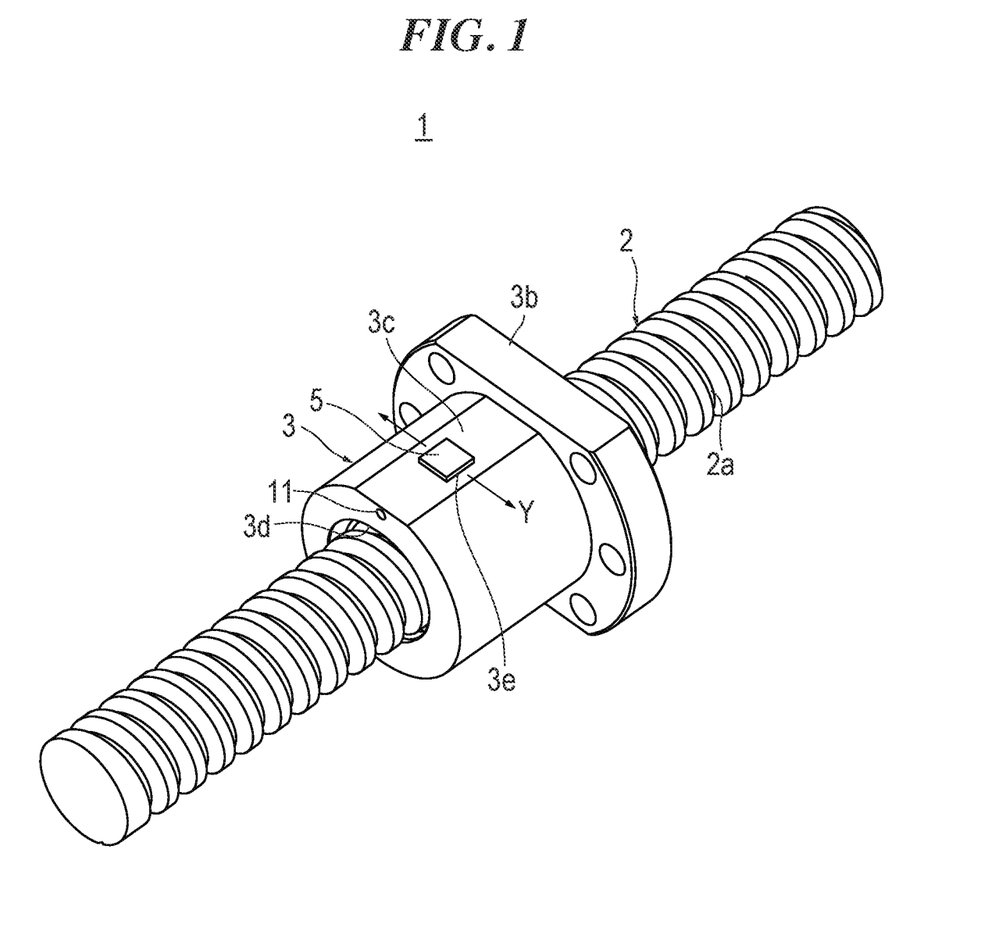
FIG. 1 is an external perspective view of a preload detectable screw device of a first embodiment of the present invention.
Figure 2:
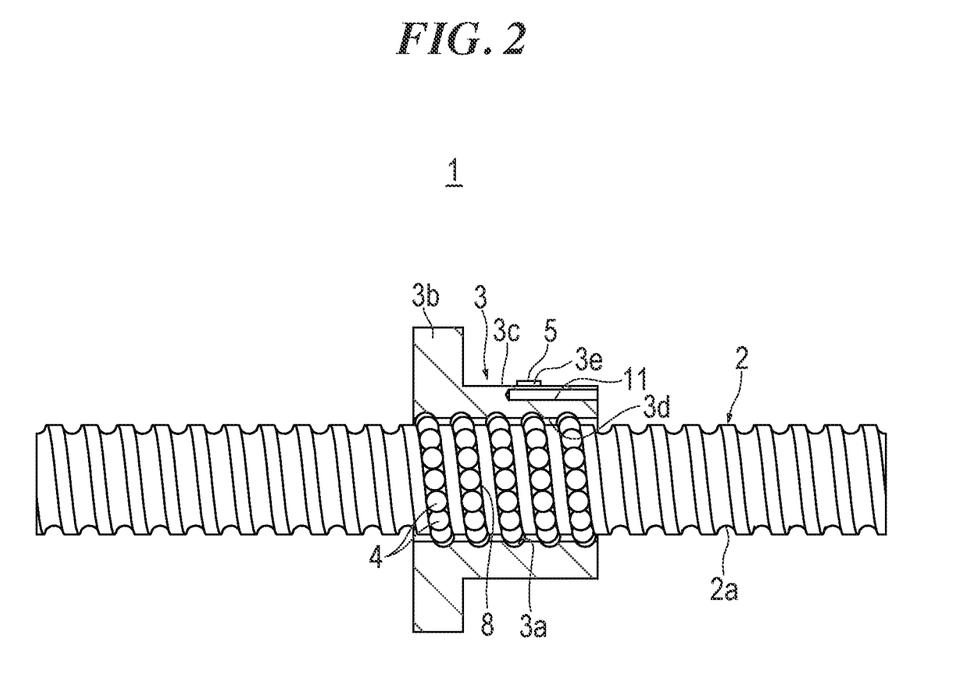
FIG. 2 is a cross-sectional view taken along the axis of the screw device of the embodiment.

FIG. 1 illustrate an external perspective view of a screw device 1 of a first embodiment of the present invention. FIG. 2 illustrates a cross-sectional view taken along the axis of the screw device 1. The screw device 1 of the embodiment includes a screw shaft 2, a nut 3, and balls 4 as rolling elements disposed between an outer groove 2a of the screw shaft 2 and an inner groove 3a of the nut 3.

The outer helical groove 2a where the balls 4 roll is formed in an outer surface of the screw shaft 2. A cross section of the outer groove 2a orthogonal to a length direction thereof has a Gothic arch shape that is two combined arcs having a slightly larger radius than the radius of the ball 4 (refer to FIG. 4B). The ball 4 contacts the outer groove 2a at two points.

The nut 3 is fitted onto the screw shaft 2. One end of the nut 3 in the axial direction is provided with a flange 3b for mounting on a mating component. An outer surface of the nut 3 is substantially cylindrical except the flange 3b. A planar flat portion 3c is formed on the outer surface of the nut 3. The inner helical groove 3a facing the outer groove 2a of the screw shaft 2 is formed in an inner surface of the nut 3. A cross section of the inner groove 3a orthogonal to a length direction thereof has a Gothic arch shape that is two combined arcs having a slightly larger radius than the radius of the ball 4 (refer to FIG. 4B). The ball 4 contacts the inner groove 3a at two points.

As illustrated in FIGS. 1 and 2, a strain sensor 5 is attached by adhesive means such as an adhesive to the flat portion 3c of the outer surface of the nut 3. The strain sensor 5 uses the principle that the resistance value changes upon expansion and contraction of a metal or semiconductor to detect strain on the outer surface of the nut 3. The strain sensor 5 of the embodiment detects strain at least in the circumferential direction on the outer surface of the nut 3 (a direction Y perpendicular to the axis of the screw shaft 2 in FIG. 1).

The type of the strain sensor 5 is not particularly limited. For example, a metal strain gauge where a metal resistor is attached on an insulator, a semiconductor strain gauge where a semiconductor is attached on an insulator, and a MEMS (Micro Electro Mechanical Systems) strain sensor produced using a semiconductor processing technology can be used.

As illustrated in FIG. 2, a helical passage 8 is formed between the outer groove 2a of the screw shaft 2 and the inner groove 3a of the nut 3. A plurality of the balls 4 is placed in the passage 8.

Figure 3:
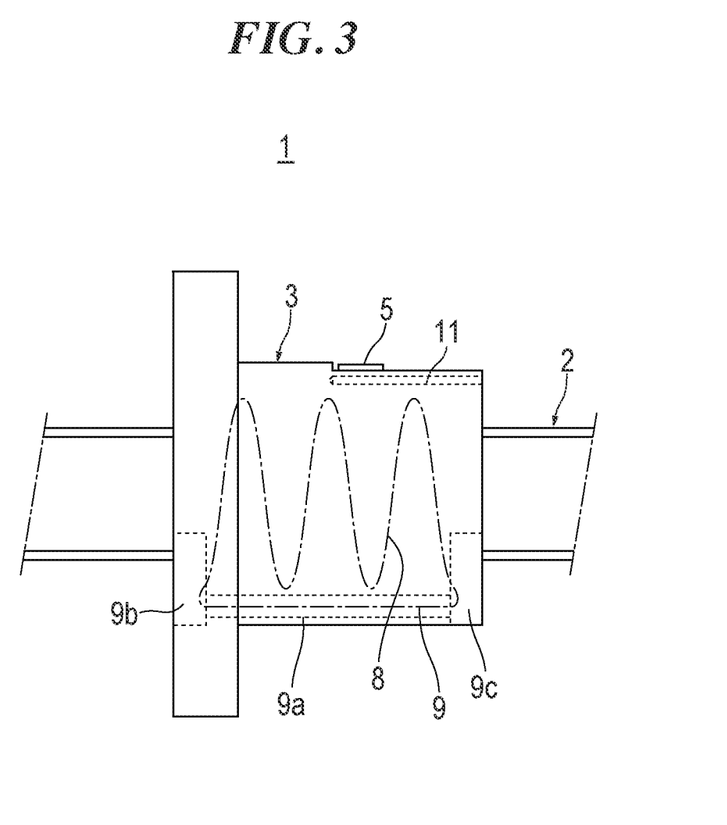
FIG. 3 is a side view of the screw device of the embodiment.

FIG. 3 illustrates a side view of the screw device 1. The center line of the passage 8 and the center line of a return path 9 connected to the passage 8 are indicated by dot-dash lines in FIG. 3. As illustrated in FIG. 3, the nut 3 is provided with the return path 9 connected to one and the other end of the passage 8 in such a manner as to allow the balls 4 to circulate therein. The return path 9 includes a through-hole 9a provided axially in the nut 3, and circulation components 9b and 9c provided, one at each end of the through-hole 9a. The circulation components 9b and 9c are mounted, one in a recess in each end surface of the nut 3 in the axial direction. A turn-around path that leads the balls 4 rolling along the passage 8 to the through-hole 9a of the nut 3 is formed in each of the circulation components 9b and 9c. The return path 9 may be configured with a return pipe that is attached to the outer surface of the nut 3.

As illustrated in FIGS. 1 and 2, a hole 11 is provided between an attachment surface 3e, to which the strain sensor 5 is attached, of the nut 3 and an inner surface 3d of the nut 3. It is also possible to provide the hole 11 between the vicinity of the attachment surface 3e of the nut 3 and the inner surface 3d of the nut 3. The hole 11 extends in the axial direction. The hole 11 is bored from an end surface of the nut 3, and runs below the attachment surface 3e.

Figure 4A:
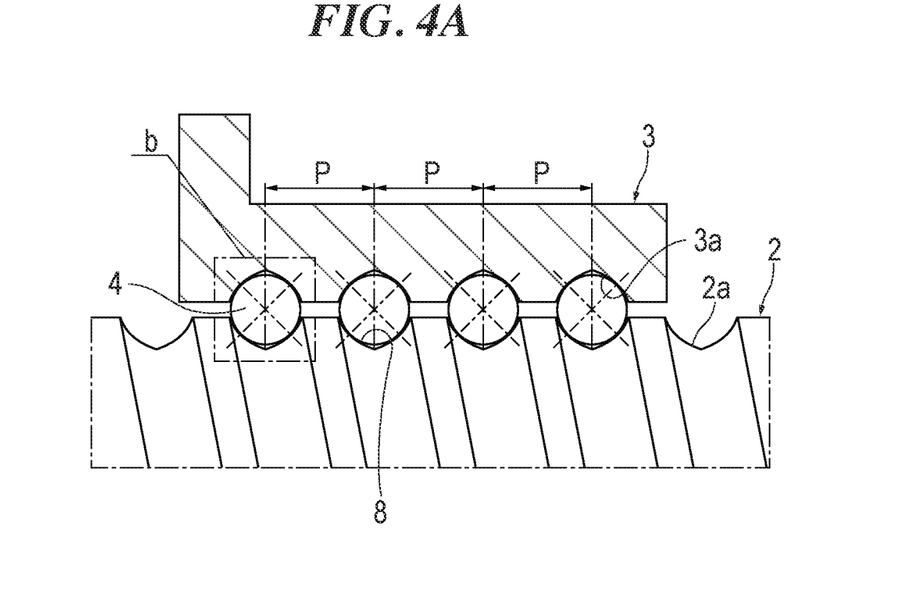
FIGS. 4A and 4B are schematic diagrams illustrating the principle of oversized ball preloading (FIG. 4A is a partial cross-sectional view of the screw device, and FIG. 4B is an enlarged view of a part b in FIG. 4A).
Figure 4B:
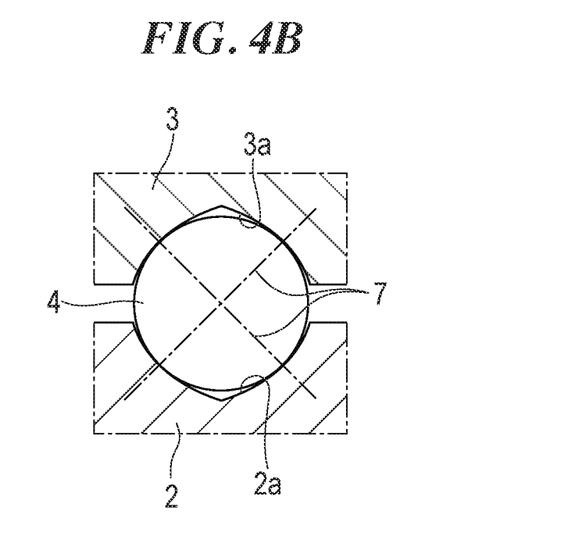

The preloading method of the screw device 1 of the embodiment is oversized ball preloading. FIGS. 4A and 4B are schematic diagrams illustrating the principle of oversized ball preloading. Used as the ball 4 is the oversized ball 4 whose diameter is larger than the passage 8 between the outer groove 2a of the screw shaft 2 and the inner groove 3a of the nut 3. The ball 4 is compressed between the outer groove 2a and the inner groove 3a. A reference sign 7 denotes a contact angle line. A pitch P of the outer groove 2a of the screw shaft 2 is constant throughout the length of the outer groove 2a. A pitch P of the inner groove 3a of the nut 3 is also constant throughout the length of the inner groove 3a.

Figure 5A:
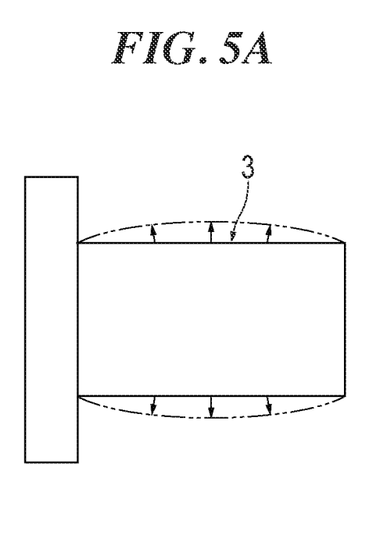
FIGS. 5A and 5B are schematic diagrams illustrating the deformation of a nut due to oversized ball preload (FIG. 5A is a side view of the nut, and FIG. 5B is a front view of the nut).
Figure 5B:
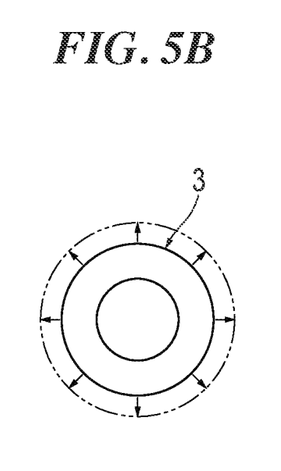

FIGS. 5A and 5B are schematic diagrams illustrating the deformation of the nut 3 due to oversized ball preload. Solid lines in FIGS. 5A and 5B indicate the nut 3 before being preloaded. Broken lines in FIGS. 5A and 5B indicate the nut 3 after being preloaded. When oversized ball preload is applied to the nut 3, the nut 3 deforms in such a manner that an outer diameter portion thereof expands. The deformation of the nut 3 is exaggerated for purposes of illustration in FIGS. 5A and 5B. However, the deformation of the nut 3 is actually small. This is because a preload acting on the nut 3 from the ball 4 is dispersed throughout the nut 3 in the case of oversized ball preload.

Figure 6A:
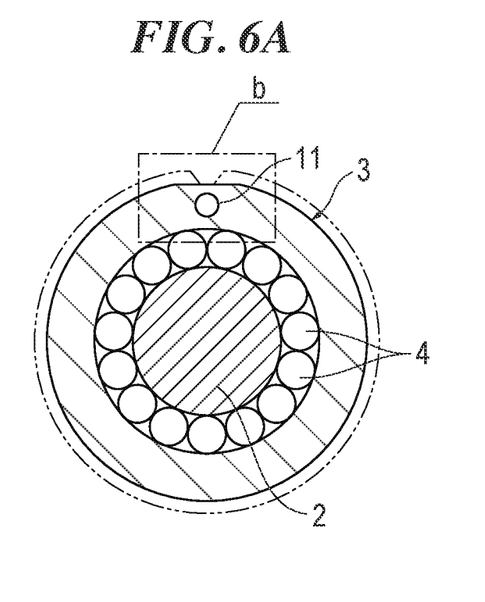
FIGS. 6A and 6B are schematic diagrams illustrating the magnitude of the amount of strain on an outer surface of the nut (FIG. 6A is a cross-sectional view perpendicular to the axis of the screw device, and FIG. 6B is an enlarged view of a part b in FIG. 6A).
Figure 6B:
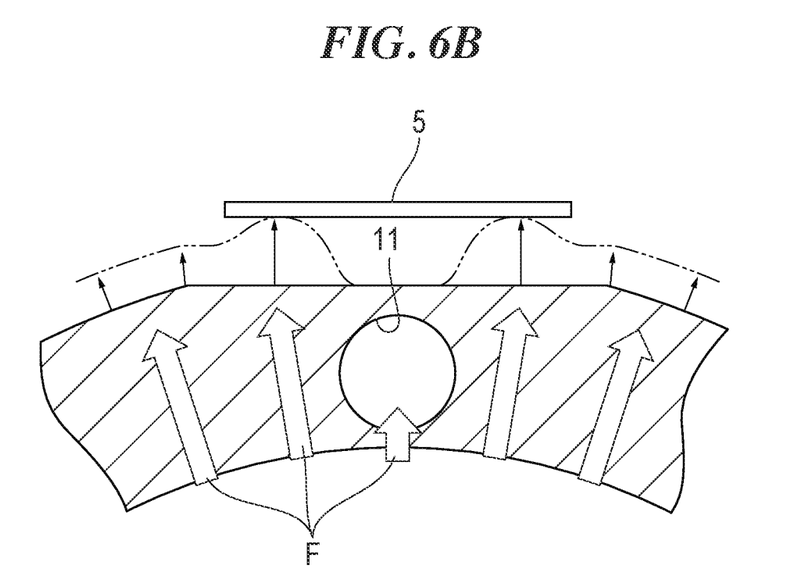

FIGS. 6A and 6B are schematic diagrams illustrating the magnitude of the amount of strain on the outer surface of the nut 3. Chain double-dashed lines indicate the magnitude of the amount of strain on the outer surface of the nut 3 in FIGS. 6A and 6B. As illustrated in FIG. 6B, the hole 11 is provided in the nut 3; accordingly, a load F due to preload does not propagate through the hole 11, and the expansion of the outer surface of the nut 3 on a radially outer side of the portion provided with the hole 11 is suppressed. Hence, a stress concentration occurs at the boundary between a portion that deforms and a portion that resists deformation on the outer surface of the nut 3, and the amount of strain is increased. If the strain sensor 5 is placed on the portion where the amount of strain is increased, the output of the strain sensor 5 can be increased. It is possible to, for example, diminish the influence of noise, increase the resolution of the strain sensor 5, and simplify an amplifier board for the strain sensor 5.

Figure 7A:
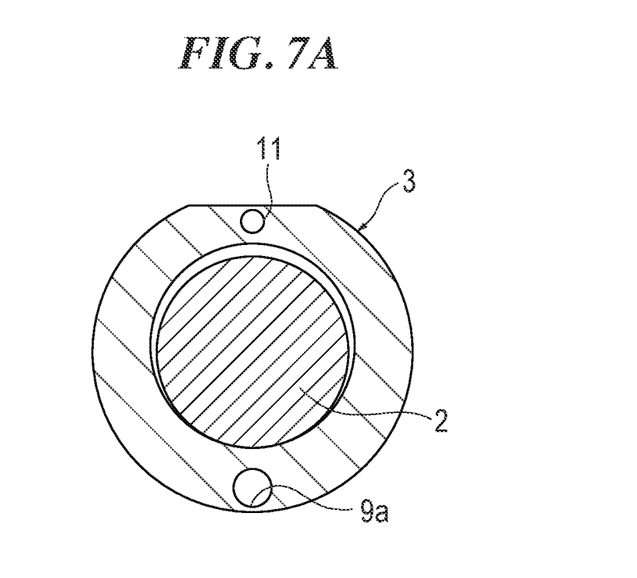
FIGS. 7A and 7B are cross-sectional views perpendicular to the axis of the screw device (FIG. 7A is a first example of the present invention where one hole is provided in the nut, and FIG. 7B is a second example of the present invention where two holes are provided in the nut).
Figure 7B:
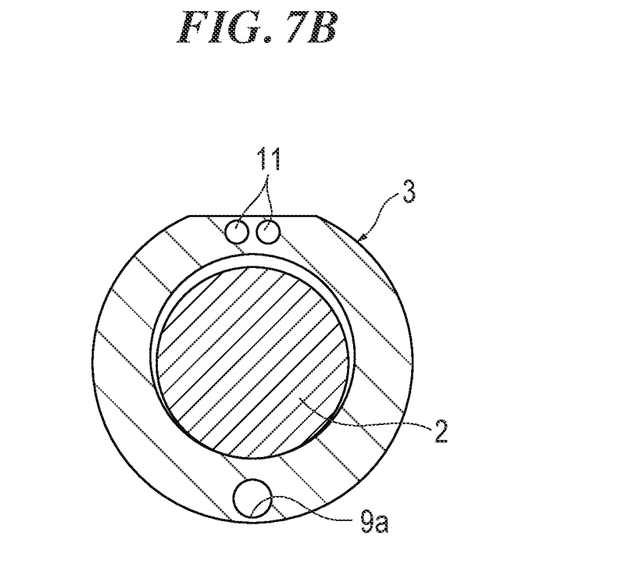

FIG. 7A illustrates a cross-sectional view of the nut 3 where one hole 11 is bored. FIG. 7B illustrates a cross-sectional view of the nut 3 where two holes 11 are bored. One hole 11, or two holes 11 that are parallel and adjacent to each other, may be bored in the nut 3. As described above, the amount of strain increases at the boundary between the portion that deforms and the portion that resists deformation on the outer surface of the nut 3. The boring of two holes 11 allows the increased amounts of strain to be superimposed.

If one hole 11 is bored, it is desirable to place the hole at a position 180 degrees apart in the circumferential direction from the through-hole 9a of the return path 9 as illustrated in FIG. 7A. Moreover, if two holes 11 are bored, it is desirable to place the center between the two holes 11 at a position 180 degrees apart in the circumferential direction from the through-hole 9a of the return path 9 as illustrated in FIG. 7B. This is because it is possible to bring the center of gravity of the nut 3 close to the center of the nut 3.

Figure 8:
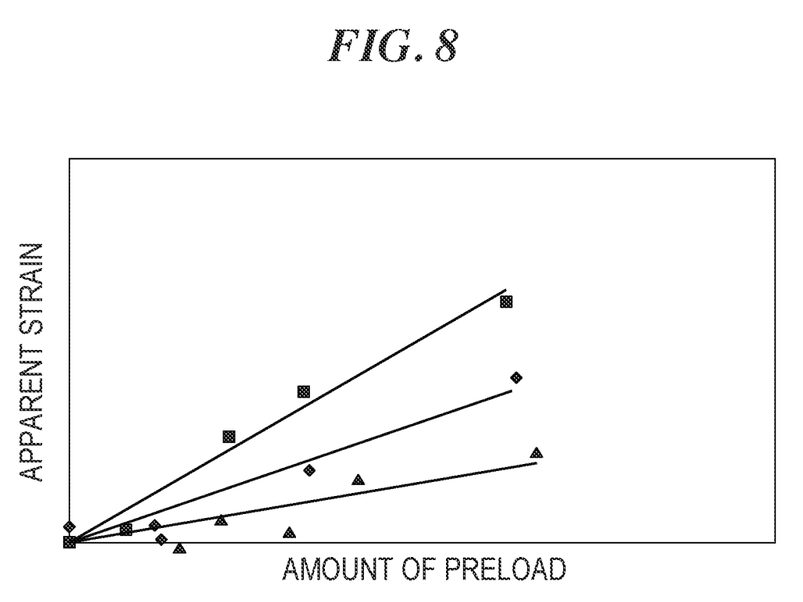
FIG. 8 is a graph illustrating the relationship between the amount of preload and the amount of apparent strain, which was obtained by experiment.

FIG. 8 is a graph illustrating the relationship between the amount of preload and the amount of apparent strain, which was obtained by experiment. The amount of apparent strain is the amount of strain in the circumferential direction on the outer surface of the nut 3. The mark ▲ in FIG. 8 represents a comparative example where the hole 11 is not provided in the nut 3. The mark ♦ in FIG. 8 represents a first example of the present invention where one hole 11 is provided in the nut 3. The mark ■ in FIG. 8 represents a second example of the present invention where two holes 11 are provided in the nut 3. If one hole 11 is provided in the nut 3, it is possible to increase the amount of apparent strain, that is, the sensitivity of the strain sensor 5 to approximately two times as compared to the case where the hole 11 is not provided. Moreover, if two holes 11 are provided in the nut 3, it is possible to increase the amount of apparent strain, that is, the sensitivity of the strain sensor 5 to approximately 3.5 times as compared to the case where the hole 11 is not provided.

Figure 9:
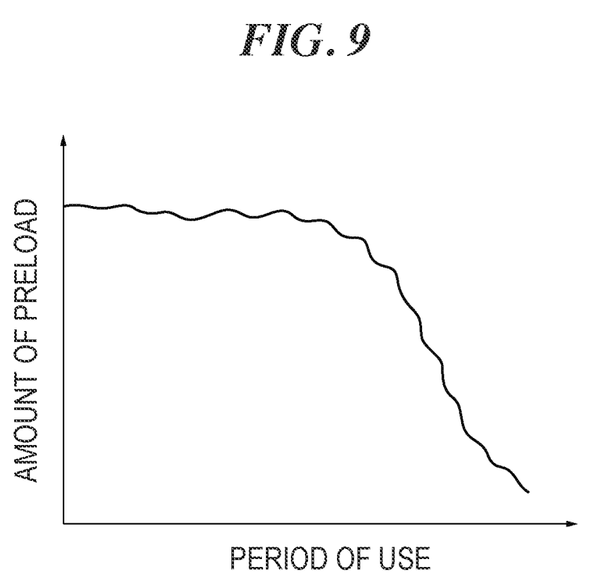
FIG. 9 is a graph illustrating the changes in the amount of preload over time.

If the screw device 1 is used for a long period of time, the balls 4, the screw shaft 2, and the nut 3 are worn, and the preload of the screw device 1 is reduced. If the preload is reduced, the strain on the outer surface of the nut 3 is reduced. The resistance value of the strain sensor 5 is reduced. The strain sensor 5 is connected to an unillustrated amplifier board. The amplifier board outputs a voltage signal based on the resistance value of the strain sensor 5. A reduction in preload can be monitored with the voltage signal of the amplifier board. FIG. 9 is a graph illustrating the changes in the voltage outputted by the amplifier board. The horizontal axis indicates the period of use of the screw device 1. The vertical axis indicates the voltage outputted by the amplifier board (that is, the remaining preload level). As illustrated in FIG. 9, it is possible to learn a reduction in the remaining preload level over time.

The IoT may be introduced to cause a transmitter to transmit the voltage signal outputted by the amplifier board to a cloud through an Internet line. A fault diagnosis system on the cloud may perform deep learning on the voltage signal outputted by the amplifier board, using artificial intelligence, to diagnose a fault in the screw device 1.

The configuration of the screw device of the embodiment has been described above. The screw device 1 of the embodiment exerts the following effects:

The hole 11 is provided between the attachment surface 3e, to which the strain sensor 5 is attached, of the nut 3 and/or the vicinity thereof and the inner surface 3d of the nut 3. Accordingly, the outer surface of the nut 3 becomes resistant to the propagation of the preload in the portion provided with the hole 11. A stress concentration occurs at the boundary between the portion that deforms and the portion that resists deformation on the outer surface of the nut 3, and the amount of strain is increased, which facilitates the strain sensor 5 detecting preload.

In the case of oversized ball preloading, strain in the circumferential direction on the nut 3 is detected to facilitate the strain sensor 5 detecting preload.

If one hole 11 is provided, it is possible to increase the sensitivity of the strain sensor 5 to, for example, approximately two times as compared to the case where the hole 11 is not provided.

If two parallel holes 11 are provided, it is possible to increase the sensitivity of the strain sensor 5 to, for example, approximately 3.5 times as compared to the case where the hole 11 is not provided.

The strain sensor 5 is attached to the flat portion 3c of the nut 3 to facilitate the attachment of the strain sensor 5 to the nut 3.

Second Embodiment

Figure 10:
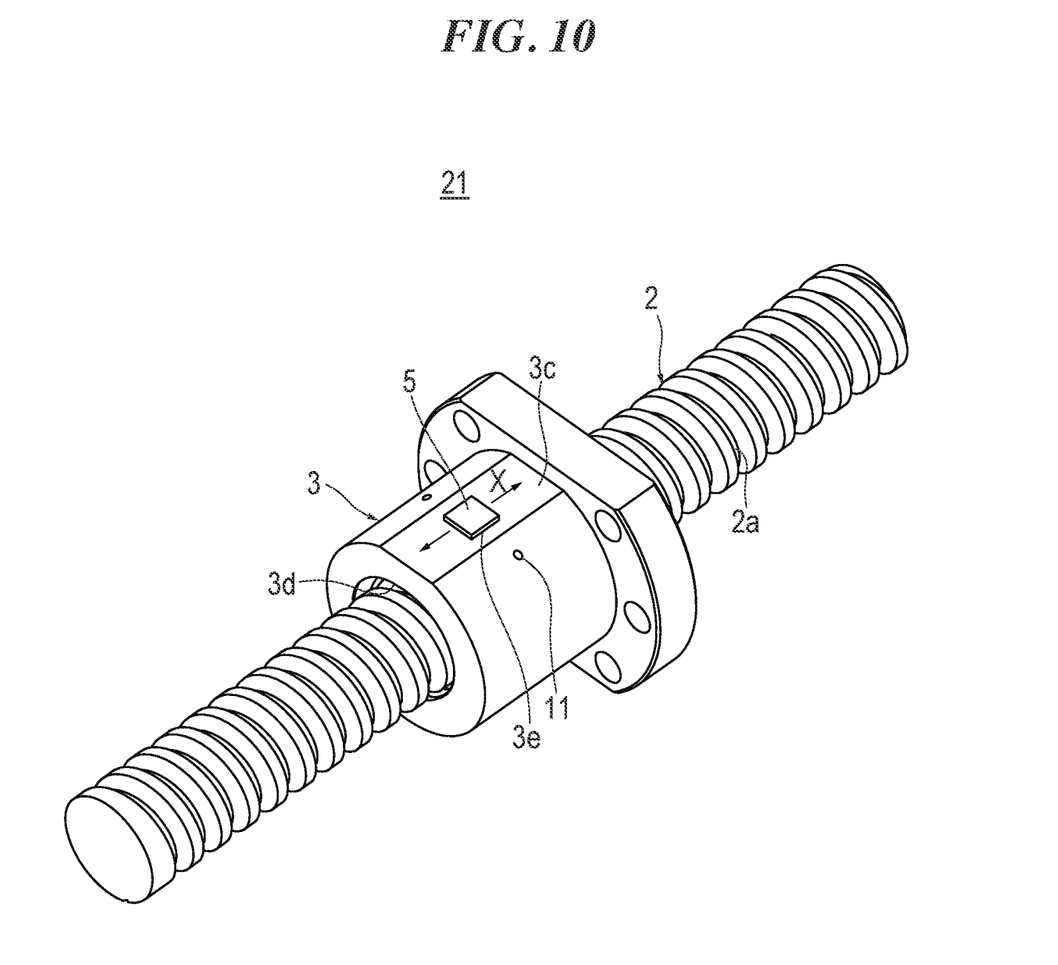
FIG. 10 is an external perspective view of a screw device of a second embodiment of the present invention.
Figure 11:
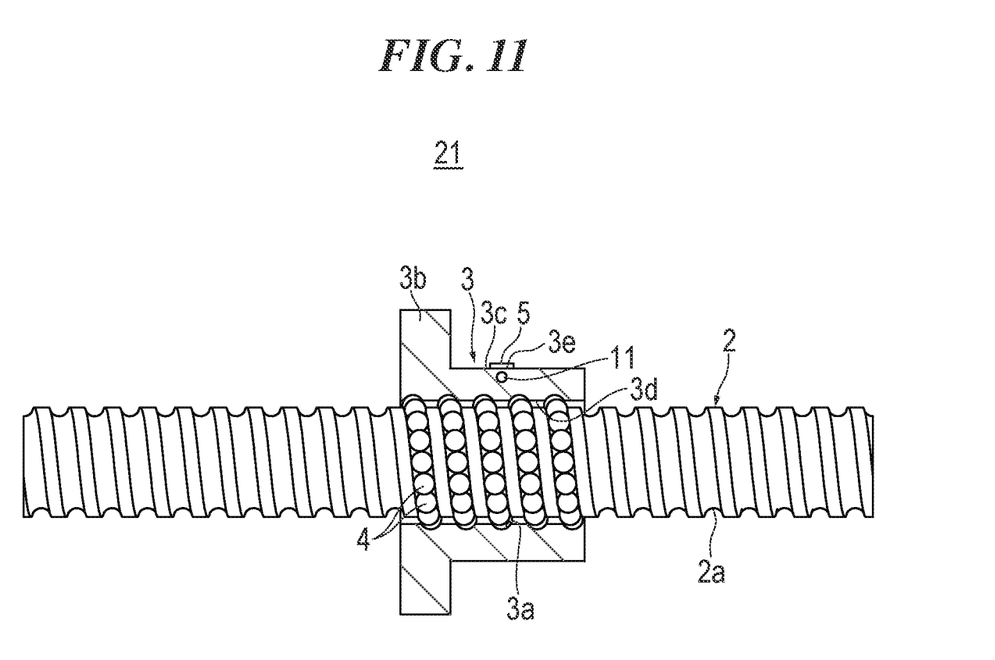
FIG. 11 is a cross-sectional view taken along the axis of the screw device of the embodiment.

FIG. 10 illustrates an external perspective view of a screw device 21 of a second embodiment of the present invention. FIG. 11 illustrates a cross-sectional view taken along the axis of the screw device 21. The screw device 21 of the second embodiment also includes a screw shaft 2, a nut 3, and balls 4 as rolling elements disposed between an outer groove 2a of the screw shaft 2 and an inner groove 3a of the nut 3.

Figure 12A:
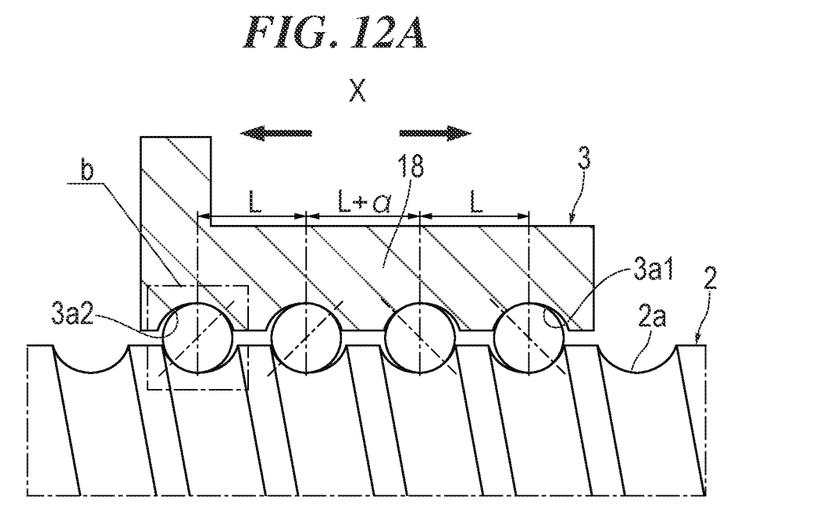
FIGS. 12A and 12B are schematic diagrams illustrating the principle of offset preloading (FIG. 12A is a partial cross-sectional view of the screw device, and FIG. 12B is an enlarged view of a part b in FIG. 12A).
Figure 12B:
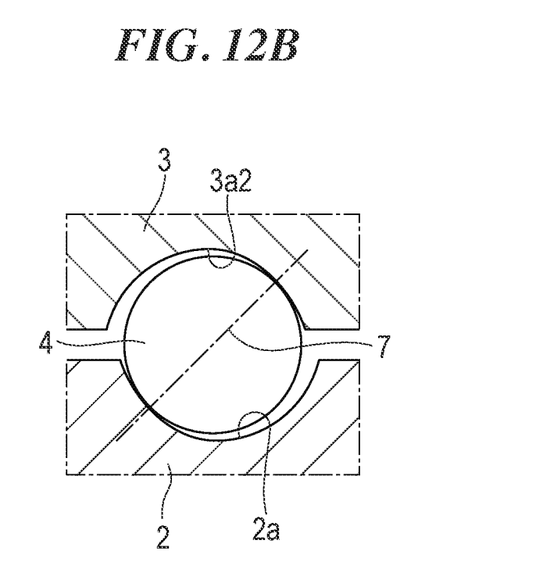

The screw device 1 of the first embodiment is the screw device 1 of oversized ball preloading, whereas the screw device 21 of the second embodiment is the screw device 21 of offset preloading. In other words, as illustrated in FIGS. 12A and 12B, a part 3a1 of the inner groove 3a of the nut 3 is offset relative to another part 3a2 of the inner groove 3a of the nut 3 in the axial direction of the nut 3. A circulation circuit that uses the part 3a1 of the inner groove 3a and a circulation circuit that uses the another part 3a2 of the inner groove 3a are different from each other. The lead of the part 3a1 of the inner groove 3a is L. The lead of the another part 3a2 of the inner groove 3a is L. The lead of an offset portion 18 between the part 3a1 and the another part 3a2 is L+cx. Offset preload may be applied in the single-start inner groove 3a, or between the threads of the double-start inner groove 3a.

As illustrated in FIG. 12B, the cross section of the outer groove 2a of the screw shaft 2 has a circular arc shape that includes a single arc having a slightly larger radius than the radius of the ball 4. The ball 4 contacts the outer groove 2a at one point. The cross section of the inner groove 3a of the nut 3 has a circular arc shape that includes a single arc having a slightly larger radius than the radius of the ball 4. The ball 4 contacts the inner groove 3a at one point. A reference sign 7 denotes a contact angle line.

As illustrated in FIGS. 10 and 11, a strain sensor 5 is attached by adhesive means such as an adhesive to a flat portion 3c of an outer surface of the nut 3. A hole 11 is provided between an attachment surface 3e, to which the strain sensor 5 is attached, of the nut 3 and an inner surface 3d of the nut 3. The hole 11 may be provided between a vicinity of the attachment surface 3e of the nut 3 and the inner surface 3d of the nut 3. The hole 11 extends in a direction perpendicular to the axial direction. Two adjacent and parallel holes 11 may be provided. The hole 11 is bored from a side surface of the nut 3, and runs below the attachment surface 3e.

According to the screw device 21 of the second embodiment, the hole 11 is provided between the attachment surface 3e, to which the strain sensor 5 is attached, of the nut 3 and/or the vicinity thereof and the inner surface 3d of the nut 3. Accordingly, the outer surface of the nut 3 becomes resistant to the propagation of a preload in the portion provided with the hole 11. A stress concentration occurs at the boundary between a portion that deforms and a portion that resists deformation on the outer surface of the nut 3. The amount of strain is increased. Accordingly, it facilitates the strain sensor 5 detecting preload.

In the case of offset preloading, the amount of strain in the axial direction on the outer surface of the nut 3 is detected to facilitate the detection of preload. This is because the nut 3 is deformed by the offset preload in such a manner as to extend in the axial direction (a direction X in FIG. 10).

The present invention is not limited to the above embodiments, and can be realized in other embodiments within the scope where the gist of the present invention is not changed. For example, a roller may be used as the rolling element instead of the balls.

In the above embodiments, the shape of the cross section of the hole orthogonal to the direction in which the hole extends is, but not limited to, a circle, and may be, for example, a rectangle. Moreover, the hole may be a straight or arc-shaped slotted hole, and/or a slit.

In the above embodiments, the inside of the hole is space. However, it is also possible to fill the hole with a filler.

The description is based on Japanese Patent Application No. 2019-019349 filed on Feb. 6, 2019, the entire contents of which are incorporated herein.

REFERENCE SIGNS LIST 1, 21 Screw device
2 Screw shaft
2a Outer groove
3 Nut
3a Inner groove
3a1 A part of the inner groove of the nut
3a2 Another part of the inner groove of the nut
3c Flat portion
3d Inner surface of the nut
3e Attachment surface
4 Ball (rolling element)
5 Strain sensor
8 Passage
9 Return path
11 Hole

The invention claimed is:

1. A preload detectable screw device comprising:
a screw shaft including an outer helical groove;
a single nut fitted on the screw shaft, the single nut including an inner helical groove, and a return path to which a passage formed between the outer groove and the inner groove is connected;
a plurality of rolling elements placed in the passage and the return path; and
a strain sensor attached to an outer surface of the single nut,
wherein at least one hole is provided between an attachment surface, to which the strain sensor is attached, of the single nut and an inner surface, to which the inner groove is formed, of the single nut.

2. A preload detectable screw device comprising:
a screw shaft including an outer helical groove;
a nut fitted on the screw shaft, the nut including an inner helical groove, and a return path to which a passage formed between the outer groove and the inner groove is connected;
a plurality of rolling elements placed in the passage and the return path; and
a strain sensor attached to an outer surface of the nut,
wherein at least one hole is provided between an attachment surface, to which the strain sensor is attached, of the nut and an inner surface of the nut,
wherein the screw device uses the plurality of rolling elements that are larger than the passage to provide oversized ball preloading, and
the strain sensor detects strain on the nut at least in a circumferential direction thereof.

3. The preload detectable screw device according to claim 1, wherein
a part of the inner groove of the single nut is offset relative to another part of the inner groove of the single nut in an axial direction of the single nut to provide offset preloading to the screw device, and
the strain sensor detects strain on the single nut in the axial direction.

4. The preload detectable screw device according to claim 1, wherein the at least one hole comprises at least two holes that are parallel and adjacent to each other.

5. The preload detectable screw device according to claim 1, wherein the strain sensor is attached to a flat portion of the outer surface of the single nut.

6. The preload detectable screw device according to claim 2, wherein the at least one hole comprises at least two holes that are parallel and adjacent to each other.

7. The preload detectable screw device according to claim 3, wherein the at least one hole comprises at least two holes that are parallel and adjacent to each other.

8. The preload detectable screw device according to claim 2, wherein the strain sensor is attached to a flat portion of the outer surface of the nut.

9. The preload detectable screw device according to claim 3, wherein the strain sensor is attached to a flat portion of the outer surface of the single nut.

10. The preload detectable screw device according to claim 4, wherein the strain sensor is attached to a flat portion of the outer surface of the single nut.

11. The preload detectable screw device according to claim 6, wherein the strain sensor is attached to a flat portion of the outer surface of the nut.

12. The preload detectable screw device according to claim 7, wherein the strain sensor is attached to a flat portion of the outer surface of the single nut.

* * * * *